Sept. 8, 1959    K. F. KUMMER    2,903,214
STATIC-WIRE SUPPORT
Filed Dec. 9, 1954
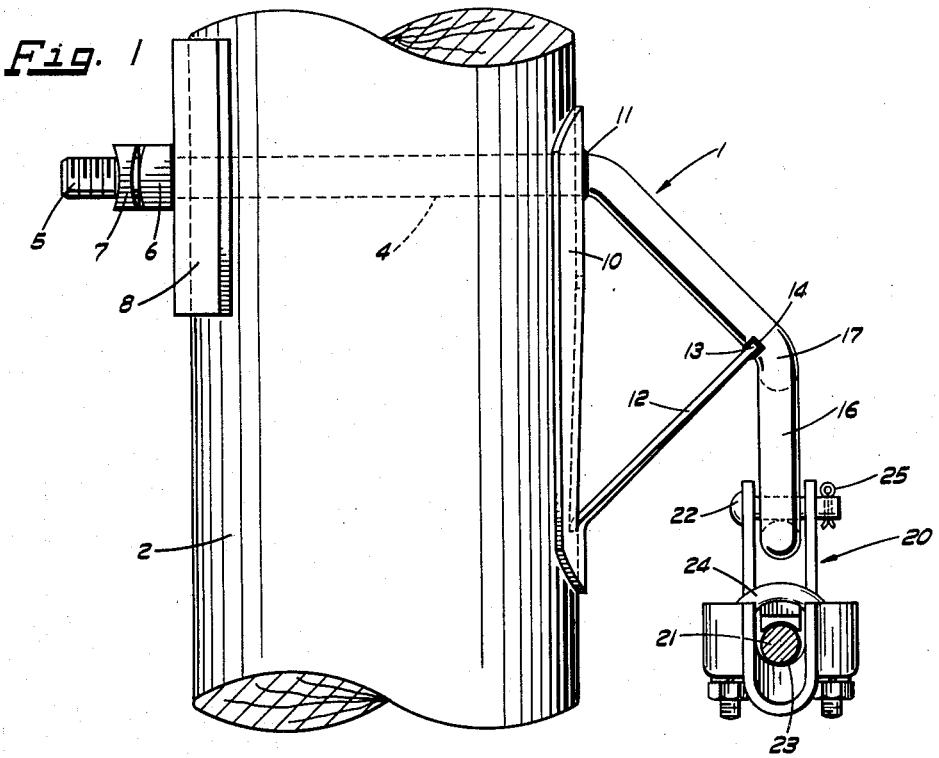
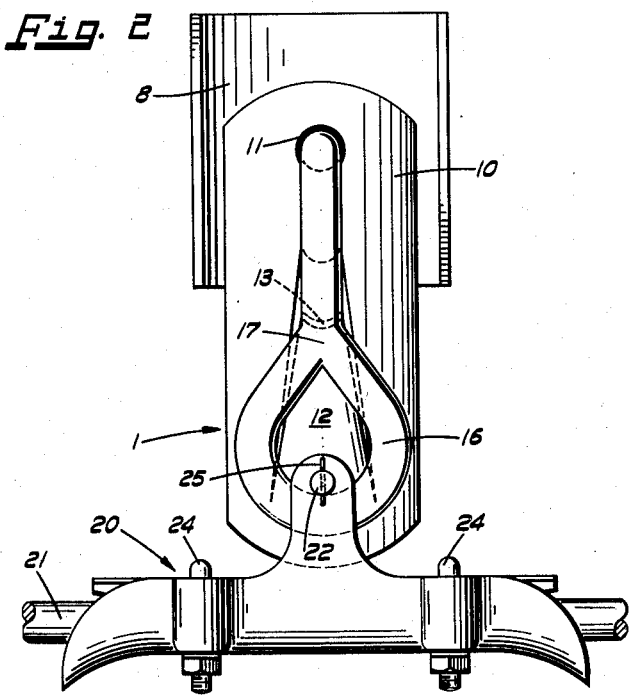
INVENTOR.
Keith F. Kummer
BY
Ralph G. Hohenfeldt
Attorney United States Patent Office 2,903,214
Patented Sept. 8, 1959

2,903,214
STATIC-WIRE SUPPORT

Keith F. Kummer, West Allis, Wis., assignor to McGraw-Edison Company, a corporation of Delaware Application December 9, 1954, Serial No. 474,216

3 Claims. (Cl. 248—71)

This invention relates to a support for an uninsulated shield wire or static-wire such as is frequently carried on a wood pole along with and above a group of overhead electric lines.

The assembly for supporting a static-wire on each pole generally comprises some sort of eye-bolt having a threaded shank extending through the pole and an eye portion disposed vertically with respect to the axis of the pole. A clamp is arranged to secure the wire and for pinning to the eye portion through the medium of an intermediate connecting member such as a link or a double ended clevis which orients the axis of the clamp in parallel relationship with the axis of the eye portion.

A principal object of this invention is to provide a static-wire support which eliminates the need for the aforementioned intermediate connecting member between the eye-bolt and the wire clamp, thus simplifying the wire support assembly, making it easier to use and reducing its cost.

Another object is to provide a wire support which is especially rugged and durable.

Other objects will appear throughout the course of this specification.

According to the invention, the shank of an eye-bolt is provided with two offset bends, each in the same direction and preferably at 45 degrees with respect to the shank. The threaded end of the bolt passes through a diametrical hole in the wood pole and the eyed end hangs downwardly with the axis of the eye hole coincident with a diameter of the pole. Thus, the eye portion lies in the same plane as the axis of the wire supporting clamp so that the latter may be engaged directly to the former by means of a headed pin passed through the eye.

The invention will now be described in detail in conjunction with the drawing in which:

Fig. 1 is a side elevational view of one embodiment of the wire supporting assembly; and Fig. 2 is a front elevational view of the same.

In Fig. 1 the wire support, designated generally by reference numeral 1, is shown supported near the top of a wood power line supporting pole 2. The support comprises a galvanized eye-bolt having a shank 4 with a threaded end 5 extending through pole 2 and secured therein by a standard nut 6 and jam nut 7 bearing against a washer or saddle plate 8 which is curved in cross section to lie snugly against the surface of the pole.

Where the shank 4 emerges from pole 2 diametrically opposite from the threaded end 5 the shank passes through a second saddle plate 10 to which it is welded at 11. In cross section, saddle plate 10 has substantially the same radius of curvature as pole 2 so that when nut 6 is tightened, plate 10 bears evenly on the surface of the pole without digging in appreciably. At the midsection of saddle plate 10 it is pressed outwardly by a shear die in a well known manner to form a brace 12 bent to define an angle of preferably 45 degrees with the saddle plate 10. The end 13 of brace 12 is notched during the shearing operation to a radius conforming with that of the eye-bolt.

The eye-bolt is provided with a pair of 45 degree offset bends, the first at 17 adjacent eye portion 16 and the second immediately adjacent weld 11 where the bolt passes through plate 10, causing eye portion 16 to be directed downwardly at an angle of 90 degrees with respect to shank 4 of the bolt. Eye portion 16 has its axis aligned with a radius of pole 2, in contrast with prior art static-wire supports which dispose the axis of the eye at 90 degrees from this position.

To counteract the cantilever action caused by applying vertical load on eye 16, brace 12 is adapted to react against the eye-bolt at 13 where it is securely welded thereto at 14 prior to galvanizing of the assembly. Note that the eye-bolt and brace 12 join to form an angle of 90 degrees between them so that the brace carries substantially a compressive stress, thus utilizing the metal to maximum effectiveness.

In Figs. 1 and 2 the structure thus far described is shown cooperating with an uninsulated wire clamp 20 of a type commonly used to support a bare wire 21 at ground potential in association with overhead electric lines. Clamp 20 is attached pivotally to the wire support by means of a galvanized steel headed pin 22 which passes through the eye portion 16 and clamp 20 in a manner evident from inspection of the drawing. The wire 21 being supported is secured rigidly against the saddle shaped portion 23 of clamp 20 by U-bolts such as 24 or other convenient means familiar to those versed in the art. By the arrangement described it is very convenient for a lineman to engage the wire 21 by means of clamp 20 and connect the latter to eye portion 16 by merely inserting a single pin 22 which may be secured by a cotter pin 25. Prior art static-wire supports require an additional link between clamp 20 and eye 16 in order to properly orient the direction of wire 21 with the eye, but this link is avoided by the invention because of it disposing the plane of the eye 16 in the plane of the supported wire 21.

It is to be appreciated that the components of the device hereinabove described are preferably made of steel which has been rendered corrosion resistant by means of a galvanizing coating.

It is seen that a simplified form of wire supporting assembly has been described which is economical to make and advantageous to use because it includes a minimum number of parts consistent with accomplishing the desired result by reason of avoiding an intermediate link between the wire clamp and eye-bolt. Moreover, the device is particularly strong because of the novel manner in which the load carrying eye-bolt is braced.

Although only the preferred form of the invention has been described, it is to be appreciated that variations in configuration of the components suggest themselves upon study of this disclosure, but the limitations of the invention are to be established only by the claims hereunto appended.

It is claimed:

1. The combination of a wire clamp and a wire support, said wire support comprising an eye-bolt including an eye and a shank, a saddle plate admitting said shank therethrough, said shank having a straight portion limited by a 45 degree offset bend adjacent said saddle plate and a similar bend adjacent said eye, both bends being deflected in the same direction with respect to said shank and the axis of the eye being parallel with the axis of the straight portion of the shank, a portion of the midsection of said saddle plate emerging integrally from the saddle plate to define a brace projecting integrally from the saddle plate and in perpendicular supporting relation with said shank between said bends and at an angle of 45 degrees with respect to said saddle plate, said wire clamp having spaced sides in parallel with each other and with the plane of the eye for receiving said eye directly therebetween.

2. An electric conductor support comprising a bolt and a saddle plate, said bolt having an eye and a shank, a first portion of said shank remote from said eye being straight, a second portion of said shank between said straight portion and said eye being bent relative to said straight portion and said eye so that the plane containing said eye is substantially perpendicular to the axis of said straight portion, said saddle plate being provided with an opening and said straight portion extending through said opening in substantially perpendicular relation to said plate, the straight portion of said shank adjacent said second portion being secured to said saddle plate peripherally of said opening, a brace having one end integral with said saddle plate at a point remote from said straight portion of said shank and the other end being secured to said shank adjacent said eye, said brace extending at an angle from said plate toward the axis of said straight portion of said shank and said eye in supporting relation to the bent portion of said shank adjacent said eye, the width of said saddle plate being very large with respect to the transverse dimension of said brace and said shank.

3. An electric conductor support as set forth in claim 2 wherein the transverse cross section of said saddle plate is inversely curved relative to said eye, said support also including a second curved saddle plate adjacent the end of said shank remote from said eye, the transverse cross section of said second saddle plate being curved in opposed relation to that of the other saddle plate.

References Cited in the file of this patent

UNITED STATES PATENTS

| | | |
|---|---|---|
| 482,163 | Cole | Sept. 6, 1892 |
| 827,272 | Tait | July 31, 1906 |
| 1,166,928 | Peirce | Jan. 4, 1916 |
| 1,827,325 | Mack | Oct. 13, 1931 |
| 1,903,024 | Brock | Mar. 28, 1933 |

FOREIGN PATENTS

| | | |
|---|---|---|
| 47,182 | Switzerland | of 1909 |